United States Patent
Ghobary et al.

(10) Patent No.: US 6,387,972 B1
(45) Date of Patent: May 14, 2002

(54) PROCESS TO ENHANCE POLYURETHANE FOAM PERFORMANCE

(75) Inventors: Hassan El Ghobary, Geneva (CH); Louis Muller, Divone-les-Baines (FR)

(73) Assignee: Crompton Corporation, Middlebury, CT (US)

( * ) Notice: Subject to any disclaimer, the term of this patent is extended or adjusted under 35 U.S.C. 154(b) by 0 days.

(21) Appl. No.: 09/784,546

(22) Filed: Feb. 15, 2001

(51) Int. Cl.$^7$ .................................................. C08J 9/00
(52) U.S. Cl. ..................... 521/115; 521/116; 521/117; 521/118; 521/128; 521/129; 521/159; 521/163; 521/164; 521/167; 521/170; 521/130
(58) Field of Search ................................ 521/115, 116, 521/117, 118, 128, 129, 159, 163, 164, 167, 170, 130

(56) References Cited

U.S. PATENT DOCUMENTS

| | | | |
|---|---|---|---|
| 2,932,621 A | 4/1960 | Terry | |
| 3,728,291 A | 4/1973 | Carroll et al. | |
| 4,007,140 A | 2/1977 | Ibbotson | |
| 4,025,466 A | 5/1977 | Jourquin et al. | |
| 4,049,591 A | 9/1977 | McEntire et al. | |
| 4,165,412 A | 8/1979 | Bechara et al. | |
| 4,175,097 A | 11/1979 | McEntire | |
| 4,232,152 A | 11/1980 | Bechara et al. | |
| 4,366,084 A | 12/1982 | Arbir et al. | |
| 4,450,246 A | 5/1984 | Jachimowicz | |
| 4,464,488 A | * 8/1984 | Zimmerman et al. | 521/115 |
| 4,621,106 A | 11/1986 | Fracalossi et al. | |
| 4,701,474 A | 10/1987 | Bailey, Jr et al. | |
| 4,785,027 A | 11/1988 | Brasington et al. | |
| 4,880,848 A | 11/1989 | Ghali | |
| 5,006,501 A | 4/1991 | Tamano et al. | |
| 5,168,009 A | 12/1992 | Petrella et al. | |
| 5,306,738 A | * 4/1994 | Yoshimura et al. | 521/117 |
| 5,478,494 A | 12/1995 | Lee et al. | |
| 5,591,781 A | 1/1997 | Yoshimura et al. | |

FOREIGN PATENT DOCUMENTS

| | | |
|---|---|---|
| CA | 651638 | 11/1962 |
| EP | 0140480 | 5/1985 |
| EP | 0656383 | 3/1999 |
| EP | 1018525 | 7/2000 |
| EP | 1018526 | 7/2000 |
| GB | 879167 | 10/1961 |
| WO | WO9402525 | 2/1994 |

* cited by examiner

Primary Examiner—John M. Cooney, Jr.
(74) Attorney, Agent, or Firm—Michael P. Dilworth

(57) ABSTRACT

An improved process to enhance polyurethane foam performance is described. Polyurethane foam is prepared by reactions between a polyisocyanate and a polyfunctional isocyanate-reactive component wherein said reactions are conducted in the presence of catalysts composed of (a) a specific reactive tertiary amine compound selected from the group consisting of bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl)ether and mixtures thereof; and (b) at least one carboxylic acid salt of the specific reactive tertiary amine compound selected from the group consisting of hydroxy-carboxylic acid salts and halo-carboxylic acid salts.

17 Claims, No Drawings

PROCESS TO ENHANCE POLYURETHANE FOAM PERFORMANCE

BACKGROUND OF THE INVENTION

This invention relates to tertiary amine carboxylic acid salt catalysts for producing polyurethane foam. The invention is especially adapted for making polyurethane foam using the one-shot foaming process, the quasi-prepolymer process or the pre-polymer process. The invention specifically relates to polyurethane catalysis with catalysts composed of (1) specific reactive tertiary amine(s) and (2) salts formed by the reaction between the specific reactive tertiary amine(s) and hydroxy- and/or halo-carboxylic acids. The expression "specific reactive tertiary amine(s)" and expressions of like import as utilized herein refers to the identified amine compounds useful in the practice of the invention herein, i.e., bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl)ether and mixtures thereof.

Polyurethane foams are produced by reacting a di- or polyisocyanate with isocyanate-reactive compounds containing two or more reactive sites, generally in the presence of blowing agent(s), catalysts, silicone-based surfactants and other auxiliary agents. For example, the isocyanate-reactive compounds are typically polyols, primary and secondary polyamines, and water. Two major reactions among the reactants, gelling and blowing, are promoted by the catalysts during the preparation of polyurethane foam. These reactions must proceed simultaneously and at a competitively balanced rate during the process in order to yield polyurethane foam with desired physical characteristics.

Reaction between the isocyanate and the polyol or polyamine, usually referred to as the gel reaction, leads to the formation of a polymer of high molecular weight. This reaction is predominant in foams blown exclusively with low boiling point organic compounds. The progress of this reaction increases the viscosity of the mixture and generally contributes to crosslink formation with polyfunctional polyols. The second major reaction occurs between isocyanate and water. This reaction adds to urethane polymer growth, and is important for producing carbon dioxide gas which promotes foaming. As a result, this reaction often is referred to as the blow reaction. The blow reaction is essential for avoiding or reducing the use of auxiliary blowing agents.

Both the gel and blow reactions occur in foams blown partially or totally with the in-situ formation of carbon dioxide gas. In fact, the in-situ generation of carbon dioxide by the blow reaction plays an essential part in the preparation of "one-shot" water-blown polyurethane foams. Water-blown polyurethane foams, particularly flexible foams, are produced by both molded and slab foam processes.

As noted above, in order to obtain good urethane foam structure, the gel and blow reactions must proceed simultaneously and at optimum balanced rates. For example, if the carbon dioxide evolution is too rapid in comparison with the gel reaction, the foam tends to collapse. Alternatively, if the gel extension reaction is too rapid in comparison with the blow reaction generating carbon dioxide, foam rise will be restricted, resulting in a high-density foam. Also, poorly balanced crosslinking reactions will adversely impact foam stability. In practice, the balancing of these two reactions is controlled by the nature of the promoters and catalysts, generally amine and/or organometallic compounds, used in the process.

Flexible and rigid foam formulations usually include, e.g., a polyol, a polyisocyanate, water, optional blowing agent (low boiling organic compound or inert gas, e.g., $CO_2$), a silicone type surfactant, and catalysts. Flexible foams are generally open-celled materials, while rigid foams usually have a high proportion of closed cells.

Historically, catalysts for producing polyurethanes have been of two general types: organo-tin compounds and tertiary amines (mono and poly). Organometallic tin catalysts predominantly favor the gelling reaction, while amine catalysts exhibit a more varied range of blow/gel balance. Using tin catalysts in flexible foam formulations also increases the quantity of closed cells contributing to foam tightness. Tertiary amines also are effective as catalysts for the chain extension reaction and can be used in combination with the organo-tin catalysts. For example, in the preparation of flexible slabstock foams, the "one-shot" process has been used wherein triethylenediamine is employed for promoting the water-isocyanate reaction and the cross-linking reaction, while an organo-tin compound is used in synergistic combination to promote the chain extension reaction.

The process for making molded foams typically involves the mixing of the starting materials with polyurethane foam production machinery and pouring the reacting mixture, as it exits the mix-head, into a mold. The principal uses of flexible molded polyurethane foams are, e.g., automotive seats, automotive headrests and armrests and furniture cushions. Some of the uses of semi-flexible molded foams include, e.g., automotive instrument panels, energy managing foam, and sound absorbing foam.

Amine emissions from polyurethane foam have become a major topic of discussion particularly in car interior applications, and some car manufacturers request that all VOCs (Volatile Organic Compounds) are reduced. One of the main components of VOCs evaporating from flexible molded foams is the amine catalyst. To reduce such emissions, catalysts having a very low vapor pressure should be used. Alternatively, if the catalysts have reactive hydroxyl or amine groups they can be linked to the polymer network. If so, insignificant amine vapor will be detected in the fogging tests. However, the use of reactive amine is not without difficulties. Reactive amines are known to degrade some fatigue properties such as humid aging compression set.

Modern molded flexible and semi-flexible polyurethane foam production processes have enjoyed significant growth. Processes such as those used in Just-in-Time (JIT) supply plants have increased the demand for rapid demold systems, i.e., systems in which the molding time is as short as possible. Gains in productivity and/or reduced part cost result from reduced cycle times. Rapid cure High Resilience (HR) molded flexible foam formulations typically achieve demold times of three to five minutes. This is accomplished by using one or more of the following: a higher mold temperature, more reactive intermediates (polyols and/or isocyanate), or increased quantity and/or activity of the catalysts.

High reactivity molded polyurethane systems give rise to a number of problems however. The fast initiation times require that the reacting chemicals be poured into a mold quickly. In some circumstances a rapid build-up of the viscosity of the rising foam causes a deterioration of its flow properties and can result in defects in the molded parts. Additionally, rapidly rising foam can reach the parting line of the mold cavity before the cover has had time to close resulting in collapsed areas in the foam. In such situations, catalysts with a long initiation time, i.e., delayed action catalysts, can potentially be used to improve the initial system flow and allow sufficient time to close the mold. As utilized herein, the expression "delayed action catalysts" is intended to refer to catalysts that display the desirable property of having a slow start followed by increased activity. That is, a delayed action catalyst will exhibit a low activity at first followed by increased activity at a later time. Catalysts exhibiting high catalytic activity following activation are especially useful. However, increasing the level of reactive catalysts in order to achieve good curing generally results in worsening the fatigue properties of the produced parts.

Another difficulty experienced in the production of molded foams, which is usually worse in the case of rapid cure foam formulations, is foam tightness. A high proportion of closed cells causes foam tightness at the time the molded foam part is removed from the mold. If left to cool in that state, the foam part will generally shrink irreversibly. A high proportion of open cells are required if the foam is to have the desired high resiliency. Consequently, foam cells have to be opened physically either by crushing the molded part or inserting it into a vacuum chamber. Many strategies have been proposed, both chemical and mechanical, to minimize the quantity of closed cells at demold.

Flexible polyurethane foams are commercially prepared as slabstock foam or in molds. Some slabstock foam is produced by pouring the mixed reactants in large boxes (discontinuous process), while other foam is prepared in a continuous manner by deposition of the reacting mixture on a paper-lined conveyor. The foam rises and cures as the conveyor advances and the foam is cut into large blocks as it exits the foam machine. Some of the uses of flexible slabstock polyurethane foams include furniture cushions, bedding, and carpet underlay.

In the discontinuous processes, the initiation of the reaction must be delayed to allow uniform laydown of the reacting mixture and escape of excess air entrapped during reactant mixing. Otherwise, foam splitting caused by the tardy release of such entrapped air may occur. In such situations, catalysts with long initiation time or delayed action catalysts can be used to achieve the required reactivity profile. The problem also can be acute with slabstock foam produced by the continuous process on a machine with a short conveyor. In this case, the formulation has to be highly catalyzed in order to be sufficiently cured when the foam reaches the cutting saw. Thus, not only is delayed action necessary for a uniform laydown, but once activated, rapid catalytic action is critical.

The principal uses of rigid polyurethane foams are, e.g., pour-in-place insulation foams for refrigeration applications, transportation applications, and metal doors, as well as boardstock and sprayed insulation. In rigid foam applications, delayed action catalysts can also find use for the same reasons needed in flexible foam molding, i.e., to delay the initial system reactivity while offering the short cure times required for fast production cycles.

U.S. Pat. No. 2,932,621 discloses the use of dimethyl-ethanolamine salts of dicarboxylic acids (such as oxalic acid) as a catalyst in the preparation of polyurethane foam.

U.S. Pat. No. 4,007,140 discloses the use of tertiary amines prepared by reacting 3-dimethylaminopropylamine with an organic acid or an acylating agent derived therefrom as catalysts for the manufacture of polyurethanes.

European Pat. No. 0,140,480 discloses the use of mono-carboxylic acid salts of bis(aminoethyl)ether derivatives as catalysts for the preparation of polyurethane foams.

More recently, it has been discovered that salts of a tertiary amine and a carboxylic acid with hydroxyl functionality could advantageously be used as a delayed action catalyst for promoting reactions involved in the production of polyurethanes, including one-shot polyurethanes, and particularly flexible polyurethane foams. This technology is described in U.S. Pat. No. 5,489,618. The use of such amine salts results in the manufacture of polyurethane foams which are either open, more easily opened, or both.

However, the need remains in the polyurethane industry for additional catalysts having a long initiation time. Most importantly, these catalysts should delay the onset of the isocyanate-polyol reaction, exhibit good curing rate, and provide excellent physical properties of produced parts. In addition, these catalyst should be capable of being incorporated into the polymer structure (i.e., reactive catalysts).

BRIEF SUMMARY OF THE INVENTION

In a first broad embodiment, the present invention provides a method for the manufacture of polyurethane foam using the one-shot foaming, the quasi-prepolymer and the pre-polymer processes. The foam is produced by reacting an organic polyisocyanate with a polyfunctional isocyanate-reactive compound in the presence of a blowing agent(s) and optional additives known to those skilled in the art, and a catalytically effective amount of a catalyst system comprising (a) a specific reactive tertiary amine compound selected from the group consisting of bis(dimethylaminopropyl) amino-2-propanol, bis(dimethylaminopropyl)amine, dimethylaminopropyldipropanolamine, bis (dimethylamino)-2-propanol, N,N,N'-trimethyl-N'-hydroxyethyl-bis(aminoethyl)ether and mixtures thereof; and (b) at least one carboxylic acid salt of the specific reactive tertiary amine compound selected from the group consisting of hydroxy-carboxylic acid salts and halo-carboxylic acid salts.

In a second broad embodiment, provided herein is a polyurethane foam having repeating units derived from the reaction of an organic polyisocyanate and a polyfunctional isocyanate-reactive compound in the presence of a blowing agent and optionally, at least one additive, and a catalyst system comprising: (a) a specific reactive tertiary amine compound selected from the group consisting of bis (dimethylaminopropyl)amino-2-propanol, bis (dimethylaminopropyl)amine, dimethylaminopropyldipropanolamine, bis (dimethylamino)-2-propanol, N,N,N'-trimethyl-N'-hydroxyethyl-bis(aminoethyl)ether and mixtures thereof; and (b) at least one carboxylic acid salt of the specific reactive tertiary amine compound selected from the group consisting of hydroxy-carboxylic acid salts and halo-carboxylic acid salts.

The expression "polyfunctional isocyanate-reactive organic compound" as used herein refers to an organic compound possessing at least two functional groups that are reactive with polyisocyanates. Polyfunctional compounds preferred for use in the invention include polyols and primary and secondary polyamines.

The use of the subject catalyst system, i.e., the specific reactive tertiary amine(s) and the derived specific reactive tertiary amine salt compositions as polyurethane catalysts unexpectedly results in the production of flexible polyurethane foams having improved durability characteristics, particularly humid aging compression set (HACS), relative to those obtained with the same reactive tertiary amine(s) alone. The expression "improved durability characteristics"

as utilized herein refers to a value of a measurement of a property or properties related to durability, e.g., HACS, being at least equal to if not better than the requirements set forth by the end user. This finding is surprising as it is well known to those skilled in the art that tertiary amine carboxylic acid salts do not significantly affect the HACS. Furthermore, the significant improvement of HACS is achieved only in conjunction with specific reactive tertiary amines and mixtures thereof. Surprisingly, the significant improvement in durability properties of various foam formulations, e.g., different technologies (TDI and MDI) and different foam densities, is achieved mainly with hydroxy- and/or halo-carboxylic acids. Such improvement is dependent on the specific reactive tertiary amine or reactive tertiary amine mixtures, the blocking percentage, and the type of hydroxy- and/or halo-carboxylic acids.

Polyurethane reaction kinetics are controlled, e.g., by the use of such catalysts, extending the time elapsed from the mixing of the reactants to the initiation of the foam forming reaction and improving the processing characteristics. Another advantage of the delayed catalytic action of the subject catalyst system(s) is improved flow of the reacting mixture and the production of more open or more easily to open foam. This quality is demonstrated by reduced force to crush (FTC). The production of more open or more easily to open foam results in foam showing less shrinkage. A further advantage of the catalyst system is the production of high resilient molded foam with improved hardness particularly when using TDI.

DETAILED DESCRIPTION OF THE INVENTION

This invention broadly relates to a process for making flexible and semi-flexible polyurethane foams and for making rigid polyurethane foams. The term "polyurethane" as utilized herein refers to the reaction product of a polyisocyanate with isocyanate-reactive compounds containing two or more reactive sites, e.g., polyols, primary and secondary polyamines, water. These reaction products are generally known to those skilled in the art as polyurethanes and polyurethane(ureas). The invention is especially suitable for making flexible, semi-flexible, and rigid foams using the one shot foaming, the quasi-pre-polymer and the pre-polymer processes. In accordance with the present invention, the polyurethane reaction kinetics are controlled in part by including in the foaming mixture a catalyst comprising (a) a tertiary amine compound selected from the group consisting of bis(dimethylaminopropyl)amino-2-propanol, bis(dimethylaminopropyl)amine, dimethylaminopropyldipropanolamine, bis(dimethylamino)-2-propanol, N,N,N'-trimethyl-N'-hydroxyethyl-bis(aminoethyl)ether, and mixtures thereof; and (b) the reaction product of the above-mentioned tertiary amine compound(s) and hydroxy- and/or halo-carboxylic acids, i.e., carboxylic acids having a hydroxyl functionality or a halo functionality or both functionalities. The polyurethane manufacturing process of the present invention typically involves the reaction of, e.g., a polyol, generally a polyol having a hydroxyl number from about 15 to about 700, an organic polyisocyanate, a blowing agent and optional additives known to those skilled in the art and one or more catalysts, at least one of which is the subject specific reactive tertiary amine(s) and the reaction product of the subject specific reactive tertiary amine(s) and hydroxy- and/or halo-carboxylic acids (i.e., the subject specific reactive tertiary amine(s) and its salt). As the blowing agent and optional additives, flexible and semi-flexible foam formulations (hereinafter referred to simply as flexible foams) also generally include, e.g., water, organic low boiling auxiliary blowing agent or an optional non-reacting gas, silicone surfactants, optional catalysts, and optional crosslinker(s). Rigid foam formulations often contain both a low boiling organic material and water for blowing.

The expression "in situ" as utilized herein refers to the formation of the delayed catalyst system in the resin, i.e. the addition of the hydroxy- and/or the halo-carboxylic acid(s) to the resin premix consisting of all the formulation components prior to the addition of the isocyanate.

The order of the addition of the additives to form a resin useful herein is not critical. That is, the specific tertiary amine(s) may be mixed with the hydroxy- and/or halo-carboxylic acid(s) in any order. Therefore, the resin premix is prepared by combining organic polyol and/or polyamine, blowing agent(s), optional additives, specific tertiary amine (s) and hydroxy- and/or halo-carboxylic acid in any order of addition. The preferred order of addition for any specific application will be determined through routine experimentation.

The "one shot foam process" for making polyurethane foam is a one-step process in which all of the ingredients necessary (or desired) for producing the foamed polyurethane product including the polyisocyanate, the organic polyol, water, catalysts, surfactant(s), optional blowing agents and the like are simply blended together, poured onto a moving conveyor or into a mold of a suitable configuration and cured. The one shot process is to be contrasted with the prepolymer process wherein a liquid prepolymer (an adduct of a polyisocyanate and a polyol normally having terminal isocyanate groups) is first prepared in the absence of any foam-generating constituents and then the prepolymer is reacted with water in the presence of catalyst in a second step to form the solid urethane polymer.

Carboxylic acids useful for preparing the reactive tertiary amine salt catalysts according to the subject invention have the general formula:

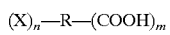

Wherein R is at least a divalent hydrocarbon moiety, typically at least a divalent linear or branched aliphatic hydrocarbon moiety and/or at least a divalent alicyclic or aromatic hydrocarbon moiety; X is independently chlorine, bromine, fluorine or hydroxyl; n is an integer having a value of at least 1 and allows for mono and poly substitution of a halogen and/or a hydroxyl on the hydrocarbon moiety and m is an integer having a value of at least 1 and allows for mono and polycarboxyl substitution on the hydrocarbon moiety, with the proviso that no single carbon atom has more than two X substituents. Generally, m and n will independently have a value of 1, 2, 3, or 4.

The "at least a divalent hydrocarbon moiety" can be a saturated or unsaturated hydrocarbon moiety of 1 to 20 carbon atoms, including a linear aliphatic hydrocarbon moiety, a branched aliphatic hydrocarbon moiety, an alicyclic hydrocarbon moiety or an aromatic hydrocarbon moiety. Stated otherwise, R can, for example, be a linear, or branched alkylene group of one to 20 carbon atoms, a cyclic alkylene group of 4 to 10 carbon atoms, or an arylene, an alkarylene, or an aralkylene group of 6 to 20 carbon atoms. Alkylenes of 2–10 carbons and 6-carbon arylenes are generally preferred. Specific non-limiting examples of suitable hydrocarbon moieties are methylene, ethylene, 1,1-propylene, 1,3-propylene, 1,2-propylene, 1,4-butylene, butylene, 1,1-amylene, 1,1-decylene, 2-ethyl- 1,1-pentylene, 2-ethylhexylene, o-, m-, p- phenylene, ethyl-p-phenylene 2,5-naphthylene, p,p'-biphenylene, cyclopentylene, cycloheptylene, xylene, 1,4-dimethylenephenylene and the like. Those skilled in the art will readily appreciate the wide variety of available hydrocarbon moieties. While the above-noted radicals have two available substitution sites, at least one for a carboxyl group and one for a hydroxyl or a halogen, it is contemplated that additional hydrogens on the hydrocarbon could be replaced with further halogen and/or hydroxyl and/or carboxyl groups.

The following hydroxy- and halo-acids are illustrative of compounds suitable for practicing the present invention: salicylic acid, benzilic acid, hydroxybenzoic acid, dihydroxybenzoic acid, trihydroxybenzoic acid, gluconic acid, citric acid, glycolic acid, dimethylolpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, chloroacetic acid, dichloroacetic acid, bromoacetic acid, dibromoacetic acid, bromobutyric acid, bromoisobutyric acid, dichlorophenylacetic acid, brommalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocaprylic acid, 2-bromohexadecanoic acid, 2,2-dichloro- 1-methyl propionic acid and mixtures thereof. Hydroxy- and halo- acids useful in the practice of the present invention generally have molecular weights below about 300,and preferably below about 200.

The reaction products of the specific reactive tertiary amine compound(s) and the hydroxy- and/or halo- acids can be prepared simply by any order of mixing of the amine compound(s) and the acid in a suitable organic solvent (e.g., glycol and alkoxyglycol) or an aqueous solvent, especially water. The hydroxy- and/or halo- acid may also be added "in situ" to the resin premix consisting of all the formulation components, including specific reactive tertiary amine compound(s), except the polyisocyanate. Neutralization of the specific reactive tertiary amine compound(s) in the resin premix by the hydroxy- and/or the halo- acid is a fast process. Equilibration products among acids and amines to form various blocked pairs are also useful. The addition of the reaction product of a specific reactive tertiary amine compound(s) and a hydroxy- and/or a halo-carboxylic acid to a resin formulation may result in a solution or a stable dispersion.

The subject catalyst of the present invention may be used as a sole catalyst or in combination with one or more subject specific reactive tertiary amine catalysts in the polyurethane production process. It can also be used in combination with one or more other catalysts useful for producing polyurethane foams, for example, tertiary amines, organometallic catalysts, e.g., organotin catalysts, metal salt catalysts, e.g., alkali metal or alkaline earth metal carboxylate catalysts, other delayed action catalysts, or other known polyurethane catalysts. Depending on the specific reactive tertiary amine compound(s) used in the formulation, the quantity of hydroxy- and/or halo-carboxylic acids reacted with the specific reactive amine compound(s) can be adjusted to improve HACS and to achieve the desired reactivity, such as the initiation delay and reactivity profile, during polyurethane formation.

Catalyst compositions contain both free specific reactive amine and bound amine in the form of the specific reactive amine and hydroxy- and/or halo-carboxylic acid reaction product, i.e., carboxylic acid salt. Acid exchange equilibrium is expected to occur if there is more than one amine present. Therefore, the amount of free amine and bound amine of these catalyst systems will vary depending upon the equilibrium of the system. Based on acid-base equivalents, the amount of the amine acid reaction product generally will be between about 2% to about 80% of the total amine equivalents in the formulation. A preferred quantity of amine present as the reaction product (specific reactive amine salt) in a resin formulation typically will be between about 2% and about 50% of the total specific reactive tertiary amine content on an equivalents basis and preferably between about 5% and about 40%.

By including the subject catalyst system of the present invention in the polyurethane reaction mixture, the initiation of the foaming reaction is delayed. Time to fall cure, however, is not adversely affected. Furthermore, surprising results are obtained, especially when using the disclosed delayed action amine catalysts for making flexible foams using the one-shot foaming process. The unexpected advantage that is realized upon using the subject catalyst system is the production of flexible foam with improved HACS.

In addition to HACS improvement, other advantages of using the disclosed modified catalysts relative to the basic tertiary amine would include, e.g., (1) a more open or more easily opened cell structure, (e.g., significant reduction in the force required to open the cells of flexible foams by mechanical crushing), (2) reduced foam shrinkage and (3) improved HR TDI molded foam hardness.

Catalysts that can be used for the production of polyurethanes in addition to the disclosed catalysts of the present invention include catalysts well known in the urethane art, e.g., tertiary amines of both the non-reactive and reactive types, organotin, or carboxylate urethane catalysts.

Organometallic catalysts or metal salt catalysts also can, and often are, used in polyurethane foam formulations. For example for flexible slabstock foams, the generally preferred metal salt and organometallic catalysts are stannous octoate and dibutyltin dilaurate respectively. For flexible molded foams, the normally preferred organometallic catalysts are dibutyltin dilaurate and dibutyltin dialkylmercaptide. For rigid foams the most often preferred metal salt and organometallic catalysts are potassium acetate, potassium octoate and dibutyltin dilaurate, respectively. Metal salt or organometallic catalysts normally are used in small amounts in polyurethane formulations, typically from about 0.001 phpp to about 0.5 phpp.

Polyols which are useful in the process of the invention for making a polyurethane, particularly via the one-shot foaming procedure, are any of the types presently employed in the art for the preparation of flexible slabstock foams, flexible molded foams, semi-flexible foams, and rigid foams. Such polyols are typically liquids at ambient temperatures and pressures and include polyether polyols and polyester polyols having hydroxyl numbers in the range of from about 15 to about 700. The hydroxyl numbers are preferably between about 20 to about 60 for flexible foams, between about 100 to about 300 for semi-flexible foams and between about 250 to about 700 for rigid foams.

For flexible foams the preferred functionality, i.e., the average number of hydroxyl groups per molecule of polyol, of the polyols is about 2 to about 4 and most preferably about 2.3 to about 3.5. For rigid foams the preferred functionality is about 2 to about 8 and most preferably about 3 to about 5.

Of the polyamines, diamines such as, e.g., piperazine, 2,5-dimethylpiperazine, bis(4-aminophenyl)ether, 1,3-phenylenediamine and hexamethylenediamine are preferred.

Polyfunctional organic compounds which can be used in the process of the present invention, alone or in admixture as copolymers, can be any of the following non-limiting classes:

a) polyether polyols derived from the reaction of polyhydroxyalkanes with one or more alkylene oxides, e.g., ethylene oxide, propylene oxide, etc.;

b) polyether polyols derived from the reaction of high-functionality alcohols, sugar alcohols, saccharides and/or high functionality amines, if desired in admixture with low-functionality alcohols and/or amines with alkylene oxides, e.g., ethylene oxide, propylene oxide, etc.;

c) polyether polyols derived from the reaction of phosphorus and polyphosporus acids with alkylene oxides, e.g., ethylene oxide, propylene oxide, etc.;

d) polyether polyols derived from the reaction of polyaromatic alcohols with alkylene oxides, e.g., ethylene oxide, propylene oxide, etc.;

e) polyether polyols derived from the reaction of ammonia and/or an amine with alkylene oxides, e.g., ethylene oxide, propylene oxide, etc.;

f) polyester polyols derived from the reaction of a polyfunctional initiator, e.g., a diol, with a hydroxycarboxylic acid or lactone thereof, e.g., hydroxylcaproic acid or e-carprolactone;

g) polyoxamate polyols derived from the reaction of an oxalate ester and a diamine, e.g., hydrazine, ethylenediamine, etc. directly in a polyether polyol;

h) polyurea polyols derived from the reaction of a diisocyanate and a diamine, e.g., hydrazine, ethylenediamine, etc. directly in a polyether polyol.

For flexible foams, preferred types of alkylene oxide adducts of polyhydroxyalkanes are the ethylene oxide and propylene oxide adducts of aliphatic triols such as glycerol, trimethylol propane, etc. For rigid foams, the preferred class of alkylene oxide adducts are the ethylene oxide and propylene oxide adducts of ammonia, toluene diamine, sucrose, and phenol-formaldehyde-amine resins (Mannich bases).

Grafted or polymer polyols are used extensively in the production of flexible foams and are, along with standard polyols, one of the preferred class of polyols useful in the process of this invention. Polymer polyols are polyols that contain a stable dispersion of a polymer, for example in the polyols a) to e) above and more preferably the polyols of type a). Other polymer polyols useful in the process of this invention are polyurea polyols and polyoxamate polyols.

The polyisocyanates that are useful in the polyurethane foam formation process of this invention are organic compounds that contain at least two isocyanate groups and generally will be any of the known aromatic or aliphatic polyisocyanates. Suitable organic polyisocyanates include, for example, the hydrocarbon diisocyanates, (e.g. the alkylenediisocyanates and the arylene diisocyanates), such as methylene diphenyl diisocyanate (MDI) and 2,4- and 2,6-toluene diisocyanate (TDI), as well as known triisocyanates and polymethylene poly(phenylene isocyanates) also known as polymeric or crude MDI. For flexible and semi-flexible foams, the preferred isocyanates generally are, e.g., mixtures of 2,4-tolulene diisocyanate and 2,6-tolulene diisocyanate (TDI) in proportions by weight of about 80% and about 20% respectively and also about 65% and about 35% respectively; mixtures of TDI and polymeric MDI, preferably in the proportion by weight of about 80% TDI and about 20% of crude polymeric MDI to about 50% TDI and about 50% crude polymeric MDI; and all polyisocyanates of the MDI type. For rigid foams, the preferred isocyanates are, e.g., polyisocyanates of the MDI type and preferably crude polymeric MDI.

The amount of polyisocyanate included in the foam formulations used relative to the amount of other materials in the formulations is described in terms of "Isocyanate Index". "Isocyanate Index" means the actual amount of polyisocyanate used divided by the theoretically required stoichiometric amount of polyisocyanate required to react with all the active hydrogen in the reaction mixture multiplied by one hundred (100) [see Oertel, *Polyurethane Handbook*, Hanser Publishers, New York, N.Y. (1985)]. The Isocyanate Indices in the reaction mixtures used in the process of this invention generally are between 60 and 140. More usually, the Isocyanate Index is: for flexible TDI foams, typically between 85 and 120; for molded TDI foams, normally between 90 and 105; for molded MDI foams, most often between 70 and 90; and for rigid MDI foams, generally between 90 and 130. Some examples of polyisocyanurate rigid foams are produced at indices as high as 250–400.

Water often is used as a reactive blowing agent in both flexible and rigid foams. In the production of flexible slabstock foams, water generally can be used in concentrations of, e.g., between 2 to 6.5 parts per hundred parts of polyol (phpp), and more often between 3.5 to 5.5 phpp. Water levels for TDI molded foams normally range, e.g., from 3 to 4.5 phpp. For MDI molded foam, the water level, for example, is more normally between 2.5 and 5 phpp. Rigid foam water levels, for example, range from 0.5 to 5 parts, and more often from 0.5 to 1 phpp. Physical blowing agents such as blowing agents based on volatile hydrocarbons or halogenated hydrocarbons and other non-reacting gases can also be used in the production of polyurethane foams in accordance with the present invention. A significant proportion of the rigid insulation foam produced is blown with volatile hydrocarbons or halogenated hydrocarbons and the preferred blowing agents are the hydrochlorofluorocarbons (HCFC) and the volatile hydrocarbons pentane and cyclopentane. In the production of flexible slabstock foams, water is the main blowing agent; however, other blowing agents can be used as auxiliary blowing agents. For flexible slabstock foams, the preferred auxiliary blowing agents are carbon dioxide and dichloromethane (methylene chloride). Other blowing agents may also be used such as, e.g., the chlorofluorocarbon (CFC) trichloromonofluoromethane (CFC-11).

Flexible molded foams typically do not use an inert, auxiliary blowing agent, and in any event incorporate less auxiliary blowing agents than slabstock foams. However, there is a great interest in the use of carbon dioxide in some molded technology. MDI molded foams in Asia and in some developing countries use methylene chloride, CFC-11 and other blowing agents. The quantity of blowing agent varies according to the desired foam density and foam hardness as recognized by those skilled in the art. When used, the amount of hydrocarbon-type blowing agent varies from, e.g., a trace amount up to about 50 parts per hundred parts of polyol (phpp) and $CO_2$ varies from, e.g., about 1 to about 10%.

Crosslinkers also may be used in the production of polyurethane foams. Crosslinkers are typically small molecules; usually less than 350 molecular weight, which contain active hydrogens for reaction with the isocyanate. The functionality of a crosslinker is greater than 3 and preferably between 3 and 5. The amount of crosslinker used can vary between about 0.1 phpp and about 20 phpp and the amount used is adjusted to achieve the required foam stabilization or foam hardness. Examples of crosslinkers include glycerine, diethanolamine, triethanolamine and tetrahydroxyethylethylenediamine.

Silicone surfactants that may be used in the process of this invention include, e.g., "hydrolysable" polysiloxane-polyoxyalkylene block copolymers, "non-hydrolysable" polysiloxane-polyoxyalkylene block copolymers, cyanoalkylpolysiloxanes, alkylpolysiloxanes, and polydimethylsiloxane oils. The type of silicone surfactant used and the amount required depends on the type of foam produced as recognized by those skilled in the art. Silicone surfactants can be used as such or dissolved in solvents such as glycols. For flexible slabstock foams the reaction mixture usually contains from about 0.1 to about 6 phpp of silicone surfactant, and more often from about 0.7 to about 2.5 phpp. For flexible molded foam the reaction mixture usually contains about 0.1 to about 5 phpp of silicone surfactant, and more often about 0.5 to about 2.5 phpp. For rigid foams the reaction mixture usually contains about 0.1 to about 5 phpp of silicone surfactant, and more often from about 0.5 to about 3.5 phpp. The amount used is adjusted to achieve the required foam cell structure and foam stabilization.

Temperatures useful for the production of polyurethanes vary depending on the type of foam and specific process used for production as well understood by those skilled in the art. Flexible slabstock foams are usually produced by mixing the reactants generally at an ambient temperature of between about 20° C. and about 40° C. The conveyor on which the foam rises and cures is essentially at ambient temperature, which temperature can vary significantly depending on the geographical area where the foam is made and the time of year. Flexible molded foams usually are produced by mixing the reactants at temperatures between about 20° C. and about 30° C., and more often between about 20° C. and about 25° C. The mixed starting materials are fed into a mold typically by pouring. The mold preferably is heated to a temperature between about 20° C. and about 70° C., and more often between about 40° C. and about 65° C. Sprayed rigid foam starting materials are mixed and sprayed at ambient temperature. Molded rigid foam starting materials are mixed at a temperature in the range of about 20° C. to about 35° C. The preferred process used for the production of flexible slabstock foams, molded foams, and rigid foams in accordance with the present invention is the "one-shot" process where the starting materials are mixed and reacted in one step.

The basic procedure used to mix the reactants and prepare laboratory foam pads for evaluation of foam properties was as follows:
1. The formulation ingredients are weighed in preparation for sequential addition to an appropriate mixing container (cardboard cup).
2. A premix of water, catalysts, and diethanolamine (DEOA) was prepared in an appropriate container.
3. A polyol, a cell opener (for MDI formulations), the premix, and a silicone surfactant are mixed thoroughly in the cardboard cup using a drill press at 2000 rpm.
4. The isocyanate was added and mixed with the other reactant ingredients.
5. The reacting mixture was poured into a 30×30×10 cm aluminum mold. The mold temperature was controlled at 60° C. (TDI) or 50° C. (MDI) by thermostat controlled hot water circulation. The mold lid had vent openings at the four corners.

Tables 2 through 4 provide measures of foam properties to permit comparison of reactivity, foam openness and HACS. Test methods used to measure the physical characteristics of the foam produced in the examples are found below in Table 1:

TABLE 1

| Physical Characteristic | Test Method |
| --- | --- |
| Density | ASTM D 3574 Test a |
| Exit Time | Exit time is the time elapsed, in seconds, from the addition of the isocyanate to the reaction mixture to the first appearance of foam extrusion from the four vents of the mold. |
| Force-to-Crush | Force-to-crush (FTC) is the peak force required to deflect a foam pad with the standard 323 cm$^2$ (50 sq. in.) indentor, 1 minute after demold, to 50% of its original thickness. It is measured with a load-testing machine using the same setup as that used for measuring foam hardness. A load tester crosshead speed of 50.8 cm/minute is used. The FTC value is a good relative measure of the degree of foam openness, i.e., the lower the value, the more open the foam |
| Hot ILD | The indentation load deflection (ILD) is measured on the same pad used for the FTC measurement three minutes after demold. Following the FTC measurement, the foam pad is completely crushed by a mechanical crusher before the measurement of ILD at 50% compression is taken. |
| HACS | Compression Set (75% compression at 70° C. for 22 h, ISO/DIS 1856) after Humid aging (5 h at 120° C. 100% RH) ISO 2440 |

The terms and abbreviations used in the specification including the following examples have the following meaning:

| Term or Abbreviation | Meaning |
| --- | --- |
| Polyol OH 28 | Reactive triol with 28 OH No. |
| Polyol OH 32 | Highly reactive triol with 32 OH No. |
| Polyol OH 18.5 | Highly reactive grafted triol with 18.5 OH No. |
| TDI 80/20 | A mixture of 80 wt. % of 2,4-tolylene diisocyanate and 20 wt. % 2,6-tolylene diisocyanate |
| MDI | Methylene diphenyl diisocyanate and blends thereof |
| DEOA | Diethanolamine |
| C1 | Dimethylaminopropyldipropanolamine |
| C2 | Bis(dimethylaminopropyl)amine |
| C3 | Bis(dimethylaminopropyl)amino-2-propanol |
| C4 | Bis(dimethylamino)-2-propanol |
| C5 | N,N,N'-trimethyl-N'-hydroxyethyl-bis(aminoethyl)ether |
| C6 | N,N-dimethylaminoethyl-N'-methylaminoethanol |
| C7 | Dimethylaminoethoxyethanol |
| C8 | Dimethylaminopropylamine |
| g | grams |
| mg | milligrams |
| s | seconds |
| min | minute |
| kg | kilograms |
| cm | centimeter |
| % | percent by weight |
| phpp | parts per hundred parts by weight of polyol |
| C | degree Celsius |
| N | Newton |
| ILD | Indention Load Deflection |
| FTC | Force-to-crush (crushing force) |

While the scope of the present invention is defined by the appended claims, the following examples illustrate certain aspects of the invention and, more particularly, describe methods for evaluation. The examples are presented for illustrative purposes and are not to be construed as limitations on the present invention.

EXAMPLES 1 TO 13 (TABLE 2)

Table 2 shows significant improvement of HACS, of MDI molded foams, was obtained due to the addition of hydroxy- and/or halo-carboxylic acids reaction product of subject tertiary amine in MDI molded foams.

EXAMPLES 14 TO 19 (TABLE 3) COMPARATIVE EXAMPLE

No improvement or significant improvement of the HACS of MDI molded foams was observed using the following reactive tertiary amines and their salts:

N,N-dimethylaminoethyl-N'-methylaminoethanol,
dimethylaminoethoxyethanol,
dimethylaminopropylamine.

EXAMPLES 20 TO 28 (TABLE 4)

Significant improvement of the HACS of TDI molded foams was obtained using the subject specific reactive tertiary amine and tertiary amine mixtures and their hydroxy- and halo-carboxylic acid salts.

TABLE 2

| Examples | 1 | 2 | 3 | 4 | 5 | 6 | 7 | 8 | 9 | 10 | 11 | 12 | 13 |
|---|---|---|---|---|---|---|---|---|---|---|---|---|---|
| Polyether polyol (OH 28) | 100 | 100 | 100 | 100 | 100 | 100 | 100 | 100 | 100 | 100 | 100 | 100 | 100 |
| Cell Opener | 1 | 1 | 1 | 1 | 1 | 1 | 1 | 1 | 1 | 1 | 1 | 1 | 1 |
| Water (total) | 4 | 4 | 4 | 4 | 4 | 4 | 4 | 4 | 4 | 4 | 4 | 4 | 4 |
| DEOA (98%) | 1 | 1 | 1 | 1 | 1 | 1 | 1 | 1 | 1 | 1 | 1 | 1 | 1 |
| Catalyst C1 | 1.2 | 1.5 | — | — | 0.675 | 0.675 | 0.705 | — | — | 0.6 | 0.6 | — | — |
| Catalyst C2 | — | — | 1.2 | 1.5 | 0.525 | 0.525 | 0.555 | — | — | — | — | — | — |
| Catalyst C3 | — | — | — | — | — | — | — | 1.2 | 1.5 | 0.6 | 0.6 | — | — |
| Catalyst C4 | — | — | — | — | — | — | — | — | — | — | — | 1.5 | 1.5 |
| 2-Chloropropionic acid | — | 0.375 | — | 0.375 | — | — | 0.3 | — | 0.375 | 0.3 | — | — | 0.25 |
| Dichloroacetic acid | — | — | — | — | 0.3 | — | — | — | — | — | 0.3 | — | — |
| Salicylic acid | — | — | — | — | — | 0.3 | — | — | — | — | — | — | — |
| Niax ® Silicone L-3011 | 1 | 1 | 1 | 1 | 1 | 1 | 1 | 1 | 1 | 1 | 1 | 1 | 1 |
| MDI (index) | 80 | 80 | 80 | 80 | 80 | 80 | 80 | 80 | 80 | 80 | 80 | 80 | 80 |
| Exit time, s | 63 | 85 | 47 | 72 | 79 | 77 | 72 | 41 | 45 | 71 | 70 | 45 | 61 |
| FTC, N | 516 | 227 | 427 | 164 | 262 | 240 | 313 | 668 | 398 | 274 | 263 | 615 | 290 |
| hot ILD, N | 190 | 153 | 179 | 157 | 164 | 157 | 168 | 179 | 189 | 167 | 158 | 172 | 145 |
| Density, kg/m$^3$ | 43.7 | 43.5 | 42.5 | 42.8 | 43.2 | 42.7 | 42.6 | 42.2 | 43.5 | 42.6 | 42.3 | 42.6 | 43.3 |
| HACS, 75% | 33.9 | 14.9 | 39.2 | 18.7 | 14.8 | 18.4 | 17.5 | 42.5 | 22.2 | 15.5 | 14.7 | 33.9 | 17.6 |

TABLE 3

| Examples | 14 | 15 | 16 | 17 | 18 | 19 |
|---|---|---|---|---|---|---|
| Polyether polyol (OH 28) | 100 | 100 | 100 | 100 | 100 | 100 |
| Cell opener | 1 | 1 | 1 | 1 | 1 | 1 |
| Water (total) | 4 | 4 | 4 | 4 | 4 | 4 |
| DEOA (98%) | 1 | 1 | 1 | 1 | 1 | 1 |
| Catalyst C6 | 1.2 | 2.1 | — | — | — | — |
| Catalyst C7 | — | — | 1 | 1.5 | — | — |
| Catalyst C8 | — | — | — | — | 1.2 | 1.5 |
| 2-Chloropropionic acid | — | 0.525 | — | 0.375 | — | 0.25 |
| Niax ® Silicone L-3011 | 1 | 1 | 1 | 1 | 1 | 1 |
| MDI (index) | 80 | 80 | 80 | 80 | 80 | 80 |
| Exit time, s | 37 | 35 | 51 | 45 | 37 | 60 |
| FTC, N | 544 | 141 | 579 | 320 | 391 | 130 |
| hot ILD, N | 154 | 135 | 171 | 157 | 169 | 125 |
| Density, kg/m$^3$ | 42.3 | 42.4 | 42.8 | 42.9 | 42.1 | 42.6 |
| HACS, 75% | 71.3 | 70.4 | 67.7 | 67.7 | 55.9 | 39.2 |

TABLE 4

| Examples | 20 | 21 | 22 | 23 | 24 | 25 | 26 | 27 | 28 |
|---|---|---|---|---|---|---|---|---|---|
| Polyether polyol (OH 32) | 50 | 50 | 50 | 50 | 50 | 50 | 50 | 50 | 50 |
| Polymer polyol (OH 18.5) | 50 | 50 | 50 | 50 | 50 | 50 | 50 | 50 | 50 |
| Water (total) | 4 | 4 | 4 | 4 | 4 | 4 | 4 | 4 | 4 |
| DEOA (98%) | 1.2 | 1.2 | 1.2 | 1.2 | 1.2 | 1.2 | 1.2 | 1.2 | 1.2 |
| Catalyst C1 | 0.8 | 0.9 | 0.45 | 0.35 | 0.54 | 0.54 | 0.42 | 0.35 | 0.4 |
| Catalyst C4 | 0.4 | 0.49 | — | — | — | — | — | — | — |
| Catalyst C5 | — | — | — | — | — | — | — | — | — |
| Catalyst C2 | — | — | 0.35 | 0.45 | 0.42 | 0.42 | 0.42 | — | — |
| Catalyst C3 | — | — | — | — | — | — | — | 0.35 | 0.4 |
| 2-Chloropropionic acid | — | 0.295 | — | — | — | — | 0.16 | — | — |
| Dichloroacetic acid | — | — | — | 0.15 | 0.24 | — | — | — | 0.2 |
| Salicylic acid | — | — | — | — | — | 0.24 | — | — | — |

TABLE 4-continued

| | Formulation, phpp | | | | | | | | |
|---|---|---|---|---|---|---|---|---|---|
| Examples | 20 | 21 | 22 | 23 | 24 | 25 | 26 | 27 | 28 |
| Niax ® Silicone L3355 | 1.5 | 1.5 | 1.5 | 1.5 | 1.5 | 1.5 | 1.5 | 1.5 | 1.5 |
| TDI 80/20 (Index) | 100 | 100 | 100 | 100 | 100 | 100 | 100 | 100 | 100 |
| Exit times | 29 | 40 | 35 | 38 | 38 | 38 | 42 | 35 | 41 |
| FTC, N | 1124 | 356 | 778 | 387 | 412 | 435 | 601 | 1082 | 512 |
| Hot ILD, N | 180 | 202 | 174 | 175 | 160 | 173 | 162 | 173 | 168 |
| Density, kg/m³ | 36.8 | 37.4 | 35.5 | 37.4 | 35.7 | 35.1 | 36.0 | 36.0 | 36.2 |
| HACS 75% | 58.5 | 26.3 | 54.8 | 26.5 | 27.6 | 29.4 | 29.0 | 53.6 | 30.6 |

We claim:

1. A process for the manufacture of polyurethane foam which comprises reacting an organic polyisocyanate with a polyfunctional isocyanate-reactive compound in the presence of a blowing agent(s) and optional additives known to those skilled in the art, and a catalytically effective amount of a catalyst system comprising:
    (a) a specific reactive tertiary amine compound selected from the group consisting of bis(dimethylaminopropyl) amino-2-propanol, bis(dimethylaminopropyl)amine, dimethylaminopropyldipropanolamine, bis (dimethylamino)-2-propanol, N,N,N'-trimethyl-N'-hydroxyethyl-bis(aminoethyl)ether and mixtures thereof; and
    (b) at least one carboxylic acid salt of the specific reactive tertiary amine compound selected from the group consisting of hydroxy-carboxylic acid salts and halo-carboxylic acid salts.

2. The process of claim 1 wherein the specific reactive tertiary amine is bis(dimethylaminopropyl)amino-2-propanol.

3. The process of claim 1 wherein the specific reactive tertiary amine is bis(dimethylaminopropyl)amine.

4. The process of claim 1 wherein the specific reactive tertiary amine is dimethylaminopropyldipropanolamine.

5. The process of claim 1 wherein the specific reactive tertiary amine is bis(dimethylamino)-2-propanol.

6. The process of claim 1 wherein the specific reactive tertiary amine is N,N,N'-trimethyl-N'-hydroxyethyl-bis (aminoethyl)ether.

7. The process of claim 1 wherein the step of reacting an organic polyisocyanate with a polyfunctional isocyanate-reactive compound in the presence of a catalytically effective amount of a catalyst system comprises a catalyst system wherein the carboxylic acid salt is the reaction product of the specific reactive tertiary amine and a carboxylic acid having the following formula:

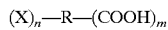

wherein R is at least a divalent hydrocarbon moiety, X is independently chlorine, bromine, fluorine or hydroxyl, m and n are integers each independently having a value of at least 1, with the proviso that no single carbon atom of R has more than two X substituents.

8. The process of claim 7 wherein the step of reacting an organic polyisocyanate with a polyfunctional isocyanate-reactive compound in the presence of a catalytically effective amount of a catalyst system comprises a catalyst system wherein the carboxylic acid is selected from the group consisting of salicylic acid, benzilic acid, hydroxybenzoic acid, dihydroxybenzoic acid, trihydroxybenzoic acid, gluconic acid, citric acid, glycolic acid, dimethylolpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, chloracetic acid, dichloracetic acid, bromoacetic acid, dibromoacetic acid, bromobutyric acid, bromoisobutyric acid, dichlorphenylacetic acid, bromomalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocaprylic acid, 2-bromohexadecanoic acid, 2,2-dichloro-1-methyl propionic acid and mixtures thereof.

9. The process of claim 1 wherein the blowing agent is selected from the group consisting of reactive blowing agents, physical blowing agents and mixtures thereof.

10. The process of claim 9 wherein the reactive blowing agent is water.

11. The process of claim 9 wherein the physical blowing agent is selected from the group consisting of volatile hydrocarbons, halogenated hydrocarbons, hydrofluorocarbons, chlorofluorocarbons, non-reacting gases and mixtures thereof.

12. The process of claim 1 wherein the optional additive is selected from the group consisting of catalysts, cross-linkers, surfactants and mixtures thereof.

13. The process of claim 12 wherein the optional catalyst is selected from the group consisting of tertiary amines, organotin compounds, carboxylate urethane catalysts and mixtures thereof.

14. The process of claim 1 wherein the catalyst system is prepared in situ.

15. A polyurethane foam having repeating units derived from the reaction of an organic polyisocyanate and a polyfunctional isocyanate-reactive compound in the presence of a blowing agent and optionally, at least one additive, and a catalyst system comprising:
    (a) a specific reactive tertiary amine compound selected from the group consisting of bis(dimethylaminopropyl) amino-2-propanol, bis(dimethylaminopropyl)amine, dimethylaminopropyldipropanolamine, bis (dimethylamino)-2-propanol, N,N,N'-trimethyl-N'-hydroxyethyl-bis(aminoethyl)ether and mixtures thereof; and
    (b) at least one carboxylic acid salt of the specific reactive tertiary amine compound selected from the group consisting of hydroxy-carboxylic acid salts and halo-carboxylic acid salts.

16. The polyurethane foam of claim 15 wherein the catalyst system comprises the equilibrium reaction product of (a) a specific reactive tertiary amine compound selected from the group consisting of bis(dimethylaminopropyl) amino-2-propanol, bis(dimethylaminopropyl)amine, dimethylaminopropyldipropanolamine, bis (dimethylamino)-2-propanol, N,N,N'-trimethyl-N'-hydroxyethyl-bis(aminoethyl)ether and mixtures thereof; and (b) at least one carboxylic acid having the following formula:

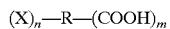

$(X)_n$—R—$(COOH)_m$ wherein R is at a least divalent hydrocarbon moiety, X is independently chlorine, bromine, fluorine or hydroxyl, m and n are integers each independently having a value of at least 1, with the proviso that no single carbon atom of R has more than two X substituents.

17. The polyurethane foam of claim 16 wherein the carboxylic acid is selected from the group consisting of salicylic acid, benzilic acid, hydroxybenzoic acid, dihydroxybenzoic acid, trihydroxybenzoic acid, gluconic acid, citric acid, glycolic acid, dimethylpropionic acid, malic acid, lactic acid, tartaric acid, 2-hydroxymethylpropionic acid, hydroxybutyric acid, chloropropionic acid, bromopropionic acid, dichloropropionic acid, dibromopropionic acid, bromobutyric acid, bromoisobutyric acid, dichlorophenylacetic acid, bromomalonic acid, dibromosuccinic acid, 3-chloro-2-hydroxypropionic acid, dichlorophthalic acid, chloromaleic acid, fluorobenzoic acid, chlorobenzoic acid, bromobenzoic acid, difluorobenzoic acid, dichlorobenzoic acid, dibromobenzoic acid, dibromosalicylic acid, 2-bromocapryic acid, 2-bromohexadecanoic acid, 2,2-dichloro-1-methyl propionic acid and mixtures thereof.

* * * * *